United States Patent [19]
Yoshikawa

[11] Patent Number: 5,166,801
[45] Date of Patent: Nov. 24, 1992

[54] LARGE SIZE DISPLAY APPARATUS FOR HIGH DEFINITION TELEVISION

[75] Inventor: Wataru Yoshikawa, Tokyo, Japan
[73] Assignee: NEC Corporation, Japan
[21] Appl. No.: 616,431
[22] Filed: Nov. 21, 1990
[30] Foreign Application Priority Data
 Nov. 22, 1989 [JP] Japan .................................. 1-304289
[51] Int. Cl.$^5$ ............................................. H04N 5/262
[52] U.S. Cl. .................................... 358/230; 358/160; 358/183; 358/22
[58] Field of Search .................... 358/230, 231, 83, 87, 358/93, 60, 140, 141, 160, 185, 188

[56] References Cited
U.S. PATENT DOCUMENTS

| 4,746,981 | 5/1988 | Nadan | 358/22 |
| 4,999,710 | 3/1991 | Senso | 358/160 |

OTHER PUBLICATIONS

6 MHZ Single Channel HDTV System by W. Schreiber, HDTV Symposium, Ottawa, Oct. 1987 pp. 1-10.
HD-PRO: A New Golbe High-Definition Video Production Format, by Richard Iredale, SMPTE Journal, Jun. 1989, pp. 439-443.
3XNTSC-A "Leapfrog" Production Standard for HDTV, by W. E. Brett, SMPTE Journal, Mar. 1989 pp. 173-178.
B-MAC and HDTV-Does it fit? by K. Lucas, Third International Colloquium on Advanced TV System: HDTV '87, Ottawa, Canada, Oct. 1987 pp. 4.3.2 to 4.3.21.

*Primary Examiner*—Tommy P. Chin
*Attorney, Agent, or Firm*—Ostrolenk, Faber, Gerb & Soffen

[57] ABSTRACT

A large-sized display for a high-definition television (HDTV) is producible at low cost by using a plurality of conventional television displays. Preferably, the large-sized display has twelve conventional display units arranged in three rows and four columns for displaying thereon a video signal of an HDTV system which has 1125 scanning lines in a frame, 60 fields per second, an aspect ratio of 16:9 and which performs interlace scanning. The large-sized display generates a clock having a first frequency produced by multiplying the horizontal synchronizing signal of the high-definition television system by n (an integer) which is the sum of 2's integral power.

2 Claims, 14 Drawing Sheets

| #1 | #2 | #3 | #4 |
| #5 | #6 | #7 | #8 |
| #9 | #10 | #11 | #12 |

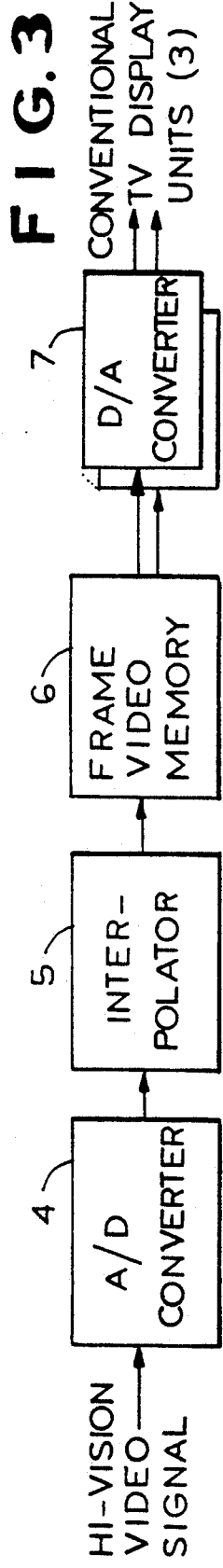
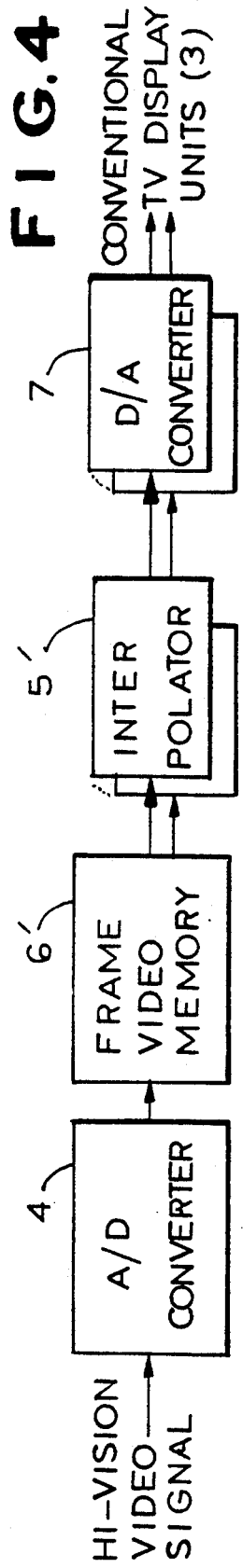
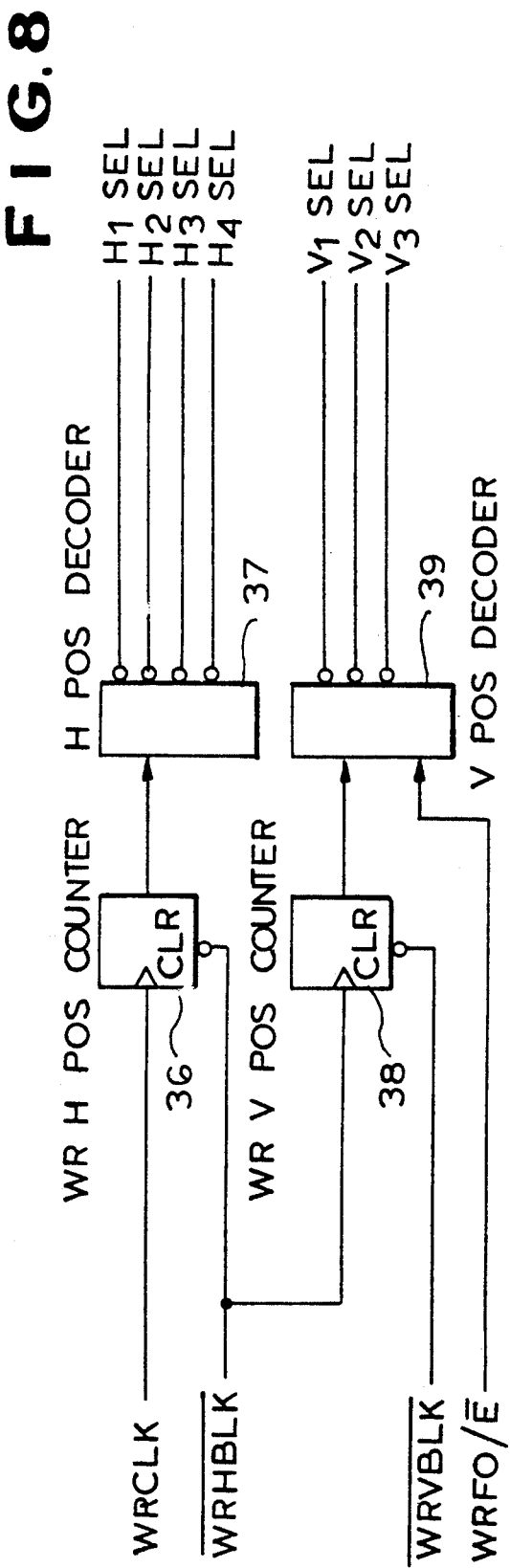

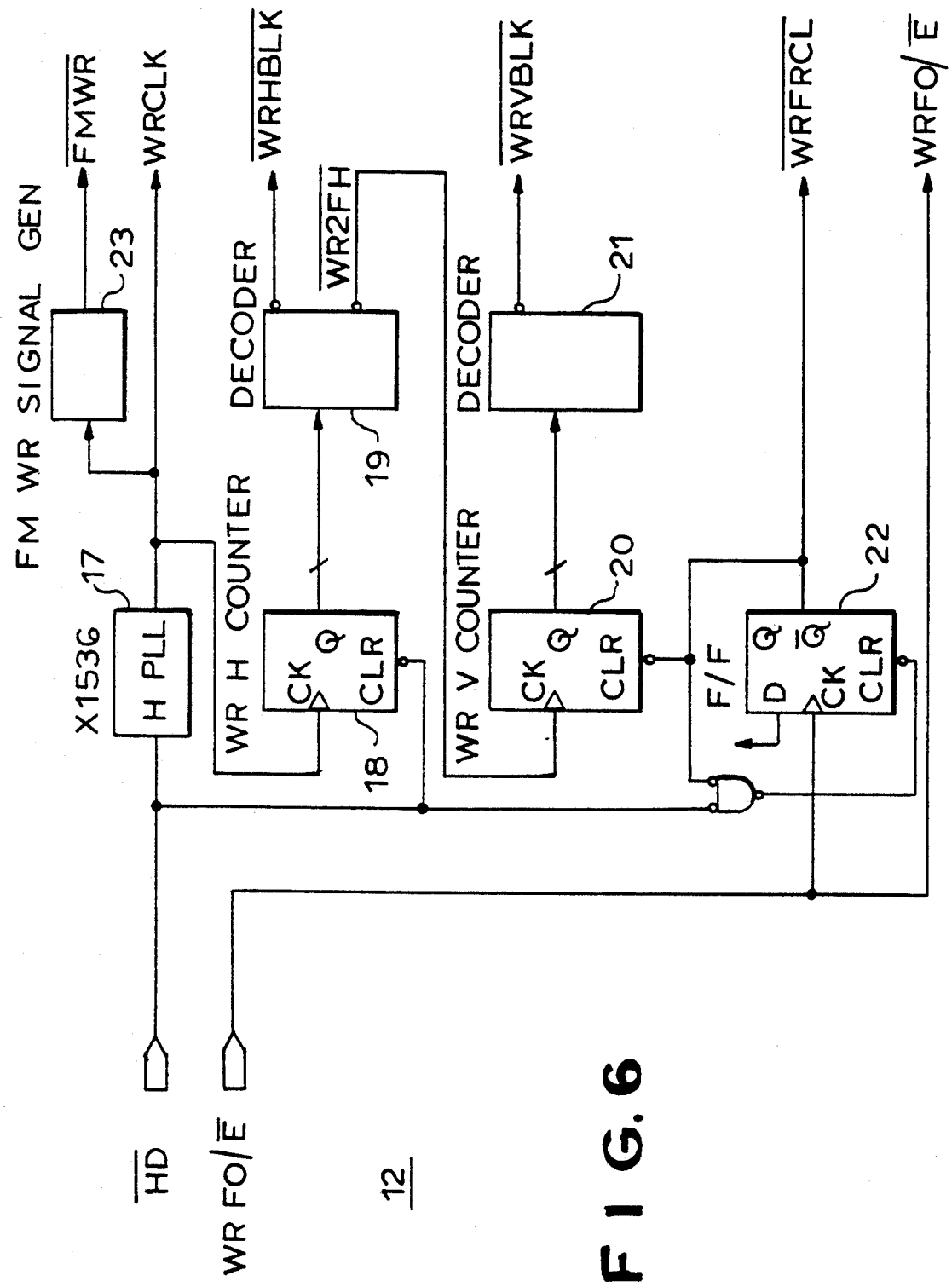
F I G. 6

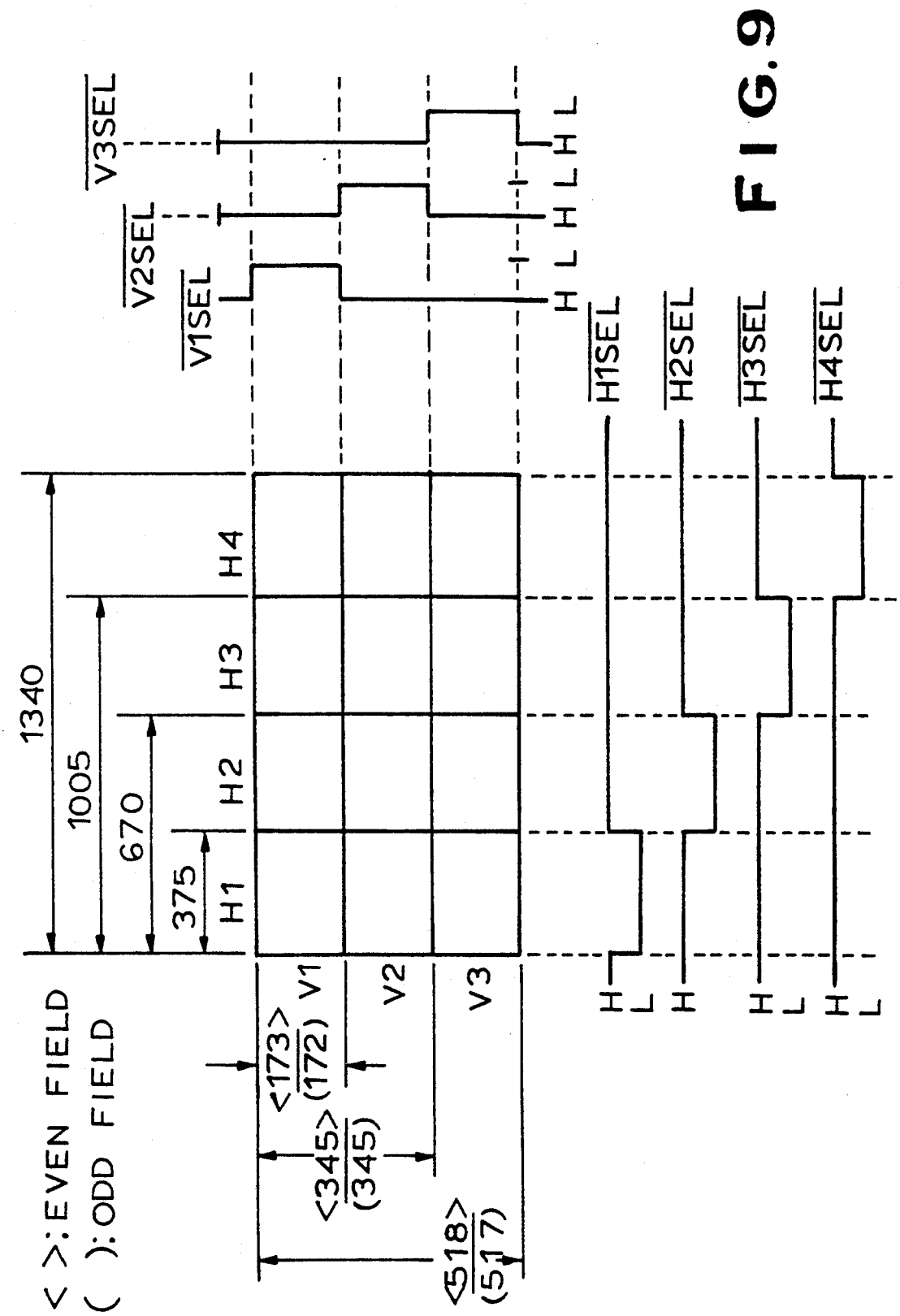

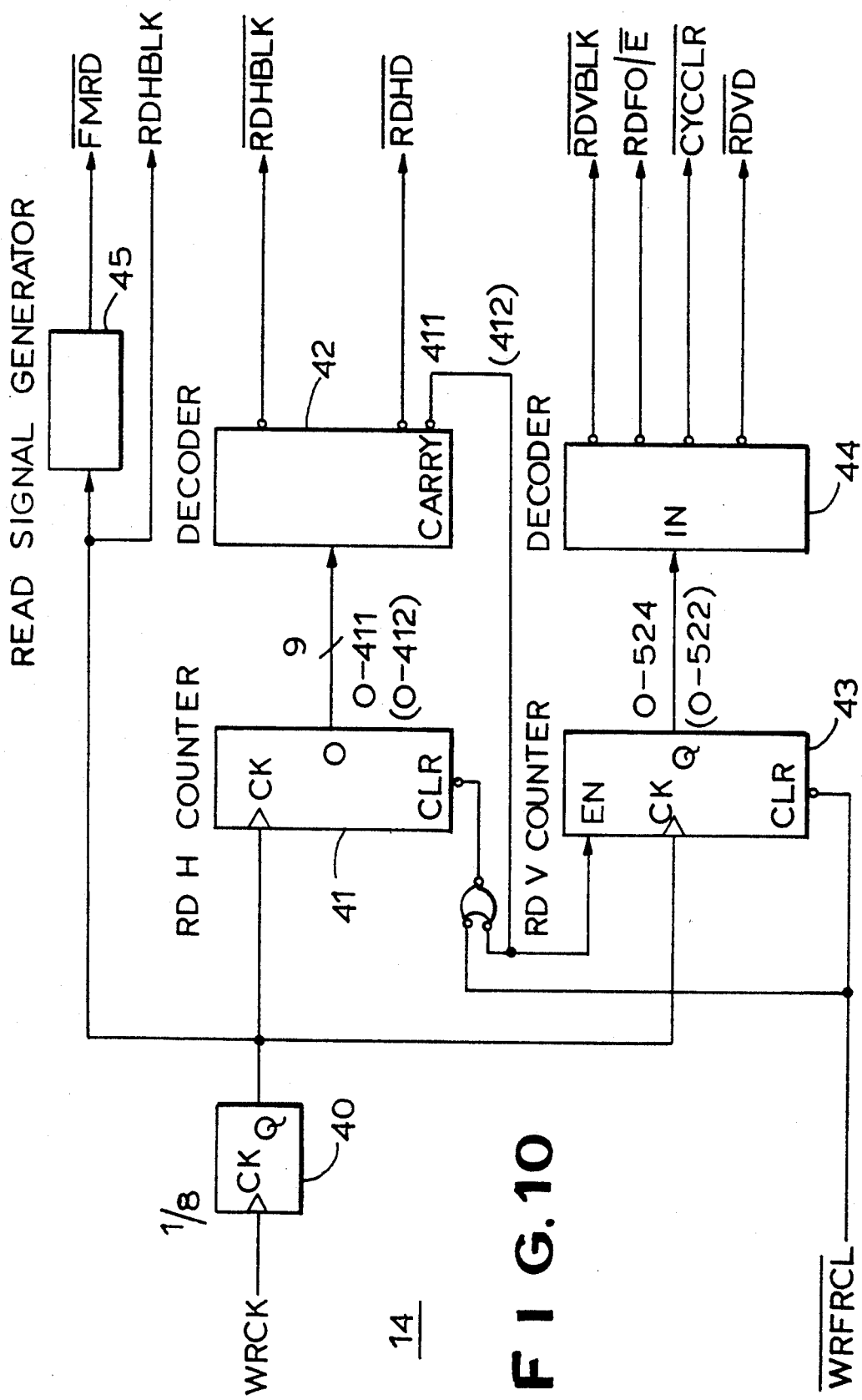
F I G. 10

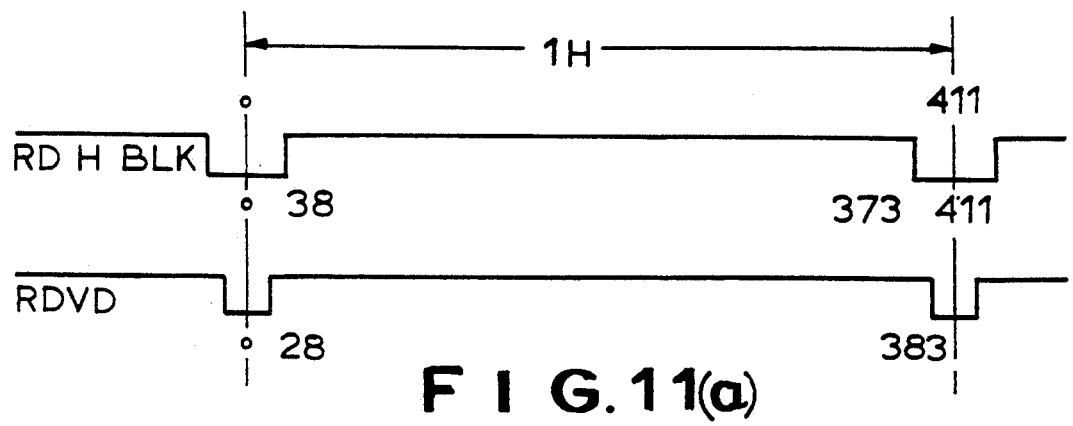
F I G. 11(a)
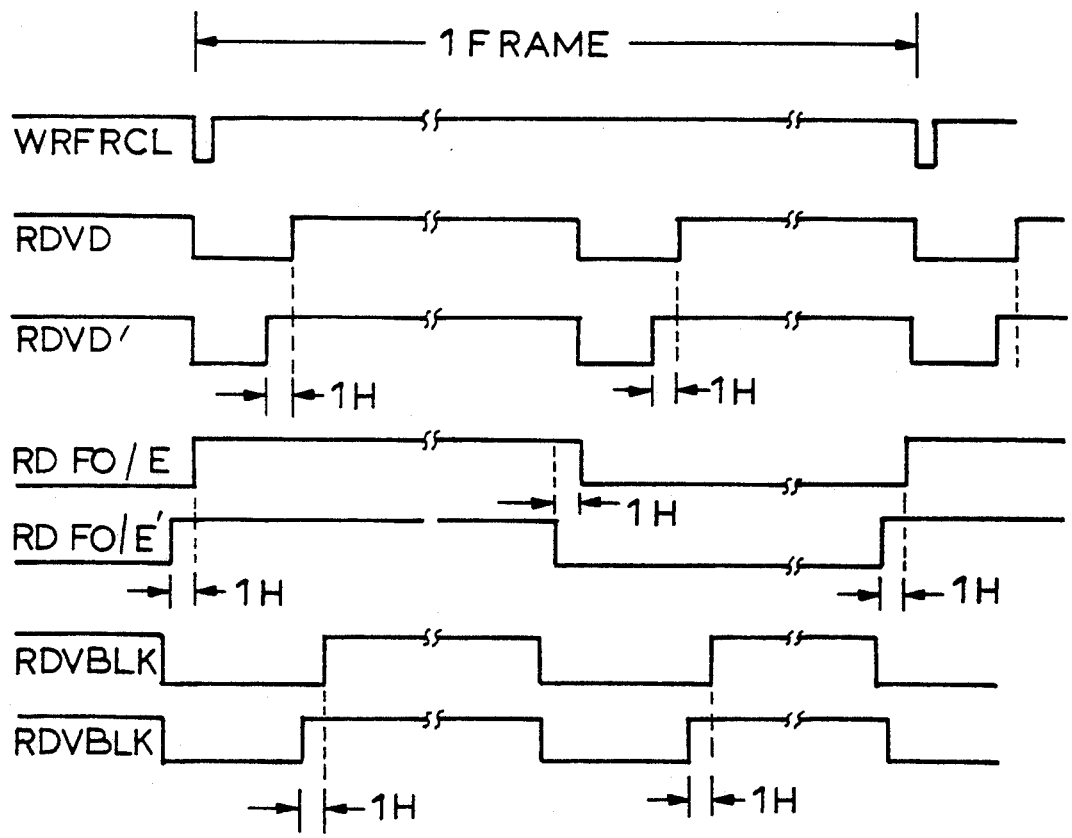
F I G. 11(b)

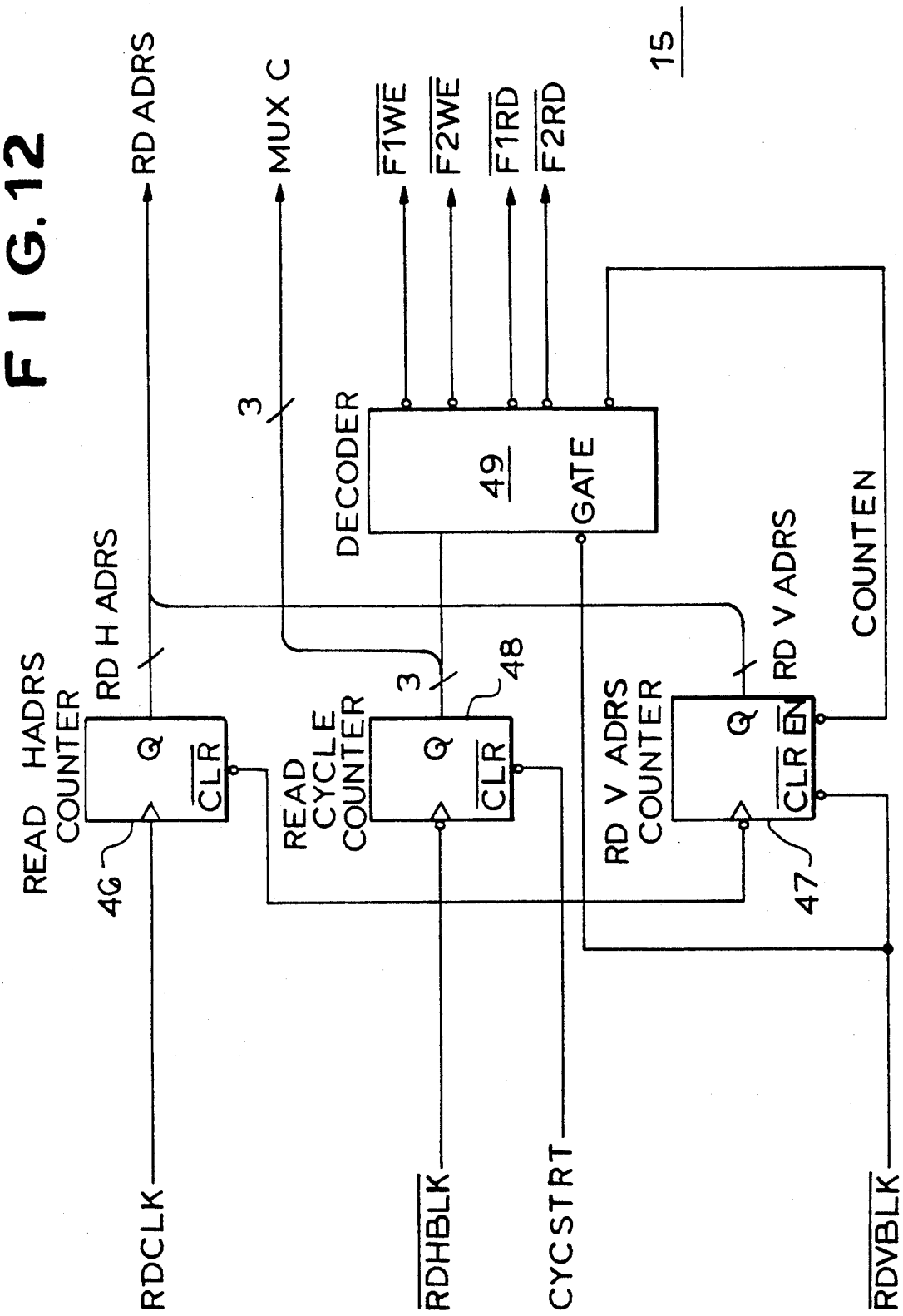

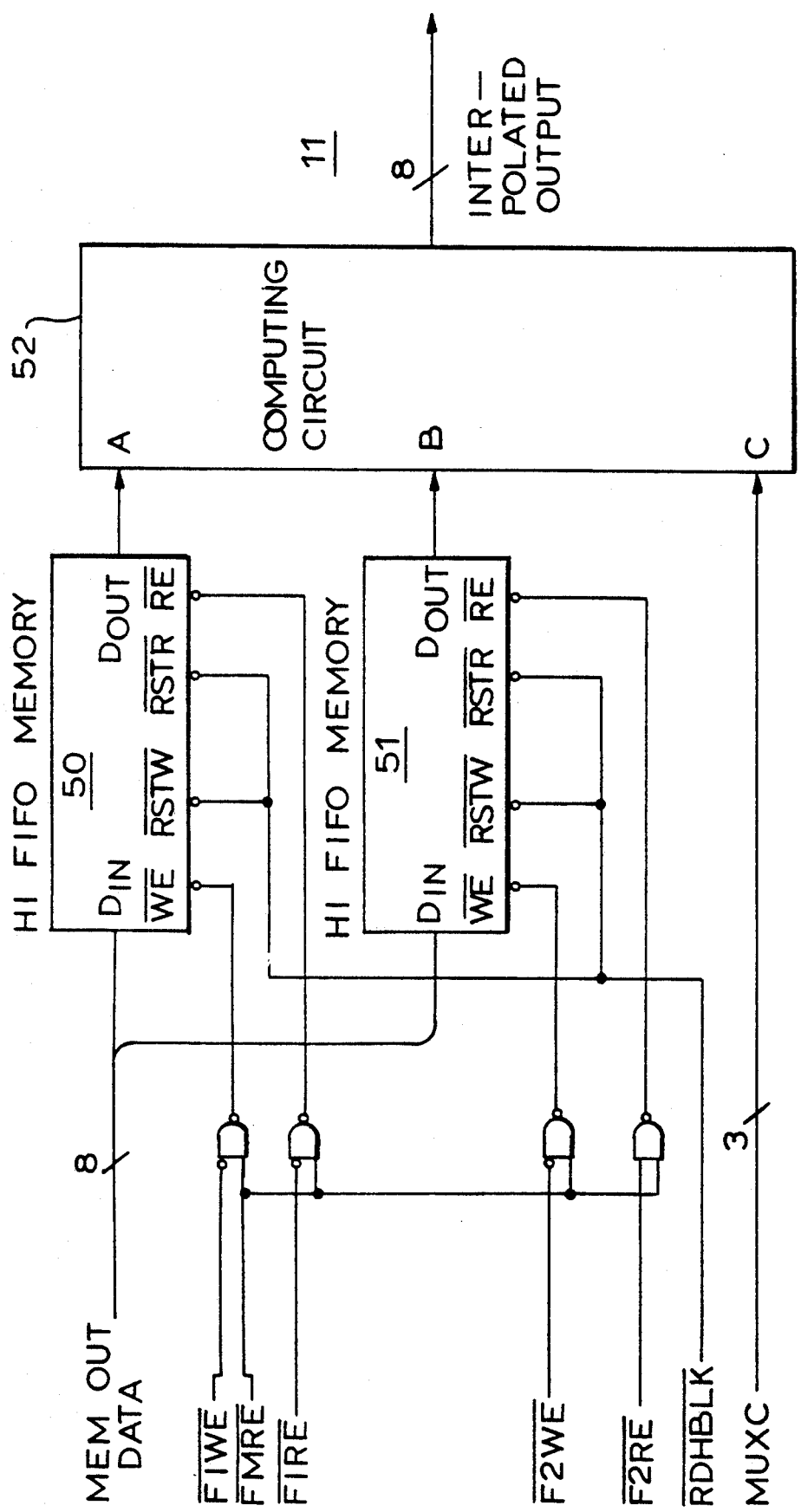

FIG. 15

(ONLY FIRST CYCLE)

| | FIFO MEMORY 50 | | FIFO MEMORY 51 | |
|---|---|---|---|---|
| | RD | WR | RD | WR |
| $Y_{m-1}$ | | $X_n$ | | |
| $Y_m$ | $X_n$ | | | $X_{n+1}$ |
| $Y_{m+1}$ | $X_n$ | $X_{n+2}$ | $X_{n+1}$ | |
| $Y_{m+2}$ | $X_{n+2}$ | | $X_{n+1}$ | $X_{n+3}$ |
| $Y_{m+3}$ | $X_{n+2}$ | | $X_{n+3}$ | |
| $Y_{m+4}$ | $X_{n+2}$ | $X_{n+4}$ | $X_{n+3}$ | $X_{n+3}$ |
| $Y_{m+5}$ | $X_{n+4}$ | | $X_{n+3}$ | |
| $Y_{m+6}$ | $X_{n+4}$ | $X_n$ | $X_n$ | $X_n$ |

$Y_{n-1} = Y_{m+6}$

LARGE SIZE DISPLAY APPARATUS FOR HIGH DEFINITION TELEVISION

BACKGROUND OF THE INVENTION

The present invention relates to a large size display apparatus for a video signal adapted for a high definition television (HDTV) system which has scanning lines twice as large in number as the scanning lines of a conventional television (TV) system and a wide aspect ratio. More particularly, the present invention is concerned with a large size display apparatus for an HDTV system, which forms a wide screen by use of a plurality of video monitors, video projectors or similar display units of an conventional TV system.

An HDTV system with the above-mentioned advanced features has a resolution comparable with that of a 35 millimeter film and is applicable to various industrial fields such as electronic publishing and film production. Especially, high definition of the HDTV system allows a picture to be displayed on a wide screen with a minimum of degradation and, therefore, promises the applicability of such a system to a large sized display.

A Hi-Vision system developed by NHK in Japan is a specific form of the HDTV system and has 1125 scanning lines in a frame, sixty fields per second, and an aspect ratio of 16:9. While the following description will concentrate on the Hi-Vision system which is most advanced regarding practical use, the present invention is of course easily applicable to any other HDTV systems.

State-of-the-art displays used for a Hi-Vision video signal are CRTs (Cathode Ray Tube) and video projectors. The maximum size of CRTs currently on the market is about 40 inches. Although video projectors may have greater sizes than CRTs, the former is inferior to the latter when it comes to the picture quality and stability, e.g., resolution, dynamic range and luminance as well as to the cost. Thus, it is difficult to provide a large size display making the most of the picture quality particular to the Hi-Vision system at low cost.

SUMMARY OF THE INVENTION

It is therefore an object of the present invention to provide a large size display apparatus for an HDTV system capable of displaying an HDTV signal at low cost by using a plurality of conventional display units.

In accordance with the present invention, a large size display apparatus has twelve conventional display units arranged in three rows and four columns for displaying a video signal of an HDTV system which has 1125 scanning lines in a frame, 60 fields per second, an aspect ratio of 16:9 and performs interlace scanning. The display apparatus includes an analog-to-digital converter (ADC) for converting an HDTV signal into a digital video signal by sampling them at the first frequency, a video memory for storing the digital video signal, a write address generator for generating write addresses for the video memory, a read address generator for generating read addresses to read out video signals meant for the twelve display units in parallel out of the video memory and interpolators for increasing the number of scanning lines by performing interpolation with outputs of the video memory, digital-to-analog converters (DACs) for converting outputs of the interpolator into analog video signals for the twelve display units.

Accordingly, the present invention realizes a large size, high picture quality screen at low cost by using conventional display units while increasing the number of scanning lines by the interpolators.

BRIEF DESCRIPTION OF THE DRAWINGS

The above and other objects, features and advantages of the present invention will become more apparent from the following detailed description taken with the accompanying drawings in which:

FIG. 3 is a block diagram schematically showing a specific construction of a signal converting part included in the illustrative embodiment;

FIG. 4 is a block diagram schematically showing another specific construction of the signal converting part;

FIG. 6 is a block diagram schematically showing a specific construction of a write clock generator shown in FIG. 5;

FIG. 8 is a block diagram schematically showing a write memory selector also shown in FIG. 5;

FIG. 9 is a chart demonstrating the operation of the write memory selector shown in FIG. 8;

FIG. 10 is a block diagram schematically showing a specific construction of a read timing generator included in the construction of FIG. 5;

FIGS. 11(a) and 11(b) are timing charts representative of the operation of the read timing generator shown in FIG. 10;

FIG. 12 is a schematic block diagram showing a specific construction of a read address generator shown in FIG. 5;

FIG. 14 is a block diagram showing a specific construction of the interpolator of FIG. 5; and FIG. 15 is a table showing writing/reading sequences of memories contained in the interpolator shown in FIG. 14.

PREFERRED EMBODIMENTS OF THE INVENTION

Figures 1, 2:
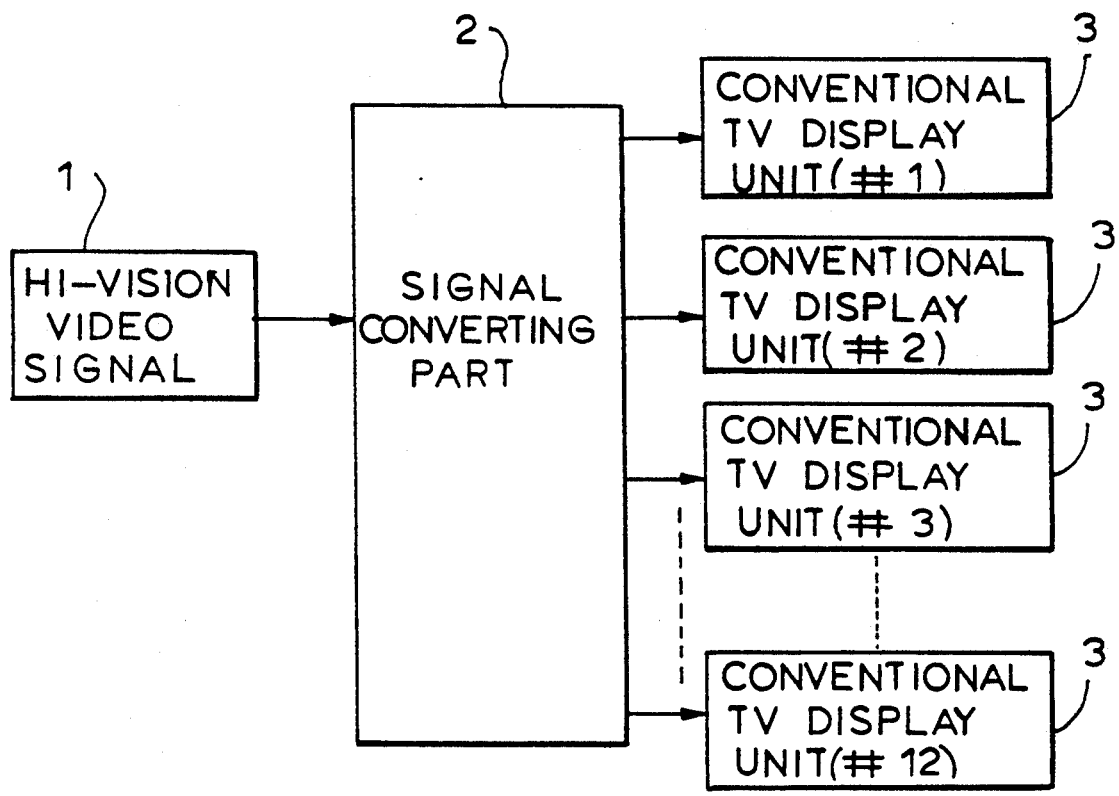
FIG. 1 is a block diagram schematically showing a display apparatus embodying the present invention.
FIG. 2 is a view showing a display screen in accordance with the present invention.

Referring to FIG. 1 of the drawings, a preferred embodiment of the present invention is shown and includes a Hi-Vision video source 1. The video source 1 feeds a video signal having a Hi-Vision format to a signal converting part 2 to be converted into twelve video signals whose format is close to a conventional TV format, for example, the NTSC format. The twelve video signals are applied to respective twelve display units 3 (#1 to #12) of the conventional TV system. As shown in FIG. 2, the display units 3 are arranged in three rows and four columns and constitute in combination a large size, Hi-Vision display. Since each conventional display has an aspect ratio of 4:3, the combination of the display units 3 have a total aspect ratio of 16:9 which is coincident with the aspect ratio of the Hi-Vision system.

FIG. 3 depicts a specific construction of the signal converting part 2 in a schematic block diagram. As shown, the signal converting part 2 has an analog-to-digital converter (ADC) 4 for converting the Hi-Vision video signal into a digital video signal, an interpolator 5 for increasing the number of horizontal scanning lines, a frame video memory 6 for storing the output of the interpolator 5, and digital-to-analog converters (DACs) 7 for converting twelve digital video signals read in parallel out of the frame video memory 6 into analog signals. These analog signals each is meant for respective one of the display units 3.

The Hi-Vision system has 1,125 horizontal scanning lines 1,035 of which are effective, while the NTSC system has 525 horizontal scanning lines 483 of which are effective. Hence, 1,035 effective horizontal scanning lines particular to the Hi-Vision system is short of 1,449 (483×3) effective horizontal scanning lines in total which is defined by the entire screen shown in FIG. 2. The interpolator 5, therefore, produces seven line outputs for five line inputs to implement the effective horizontal scanning lines of the screen of FIG. 2, i.e. 1035×7/5=1449.

The Hi-Vision system has a horizontal and a vertical synchronizing frequency of 33.75 kHz and 60 Hz, respectively. On the other hand, the NTSC system has a horizontal and a vertical synchronizing frequency of 15.734 kHz and 59.94 Hz, respectively. To display a video image despite such differences between the two systems, the video signal is written to the frame video memory 6 at the sampling rate of the Hi-Vision video signal and then read them out at the sampling rate of the NTSC video signal. This kind of procedure is generally referred to as scan conversion. The frame video memory 6 is made up of twelve memory units each corresponding to one frame of the NTSC system, as will be described. The Hi-Vision video signal is sequentially and selectively written to the twelve memory units on the basis of the input sequence of the Hi-Vision video signal and twelve video signals are read out in parallel on the basis of the output sequence of the NTSC video signal.

FIG. 4 shows another specific construction of the signal converting part 2. The construction of FIG. 4 is similar to that of FIG. 3 except that interpolators 5' are connected to the output of a frame video memory 6'. Since the interpolator 5' processes signals having been transformed into a format of the NTSC system, it is operable at a lower speed than the interpolator 5 of FIG. 3, and can be implemented with an inexpensive device. The following description will concentrate on the specific arrangement of FIG. 4 by way of example.

Figure 5A:
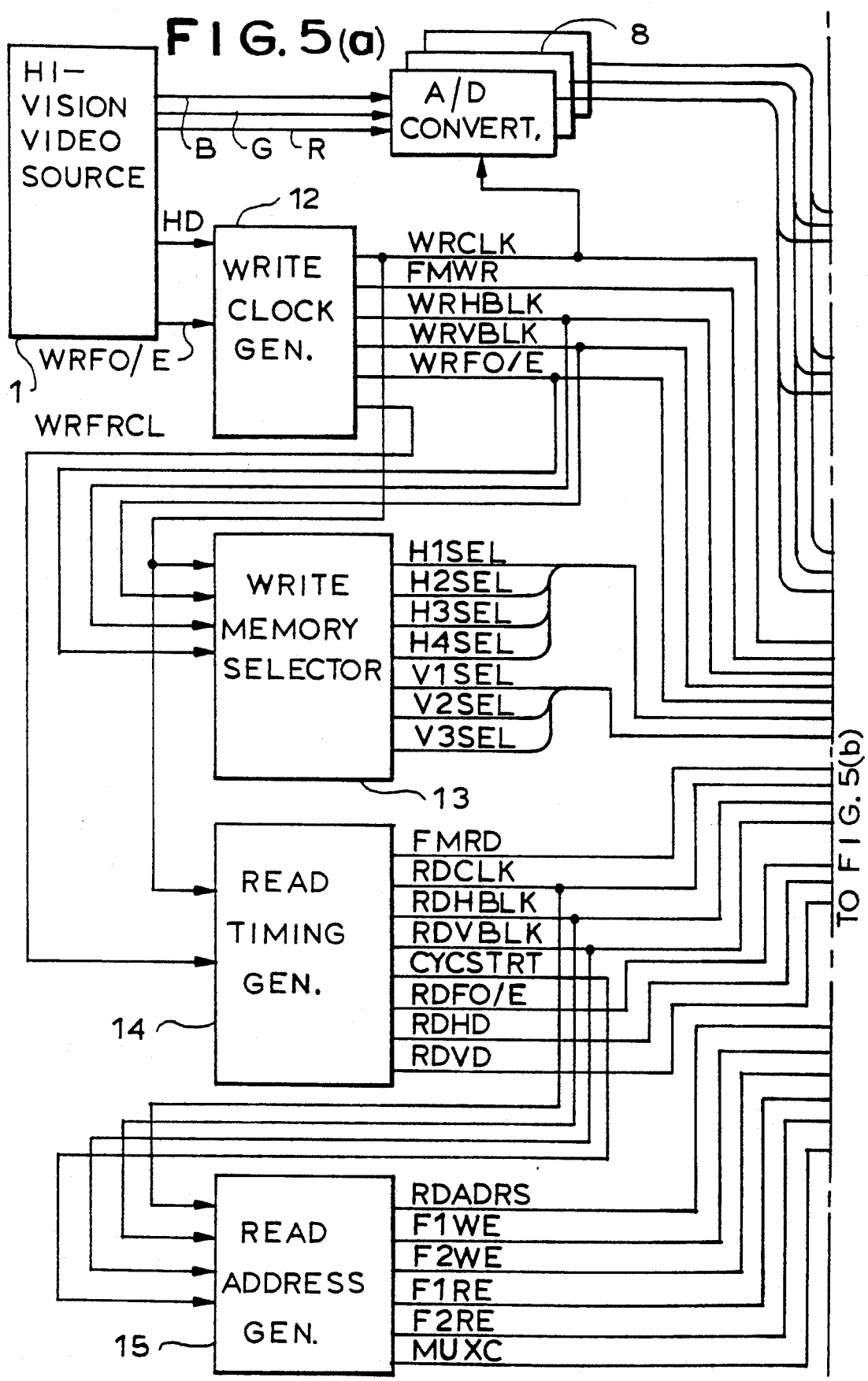
FIG. 5 is a block diagram schematically showing a specific construction including the signal converting part of FIG. 4.
Figure 5B:
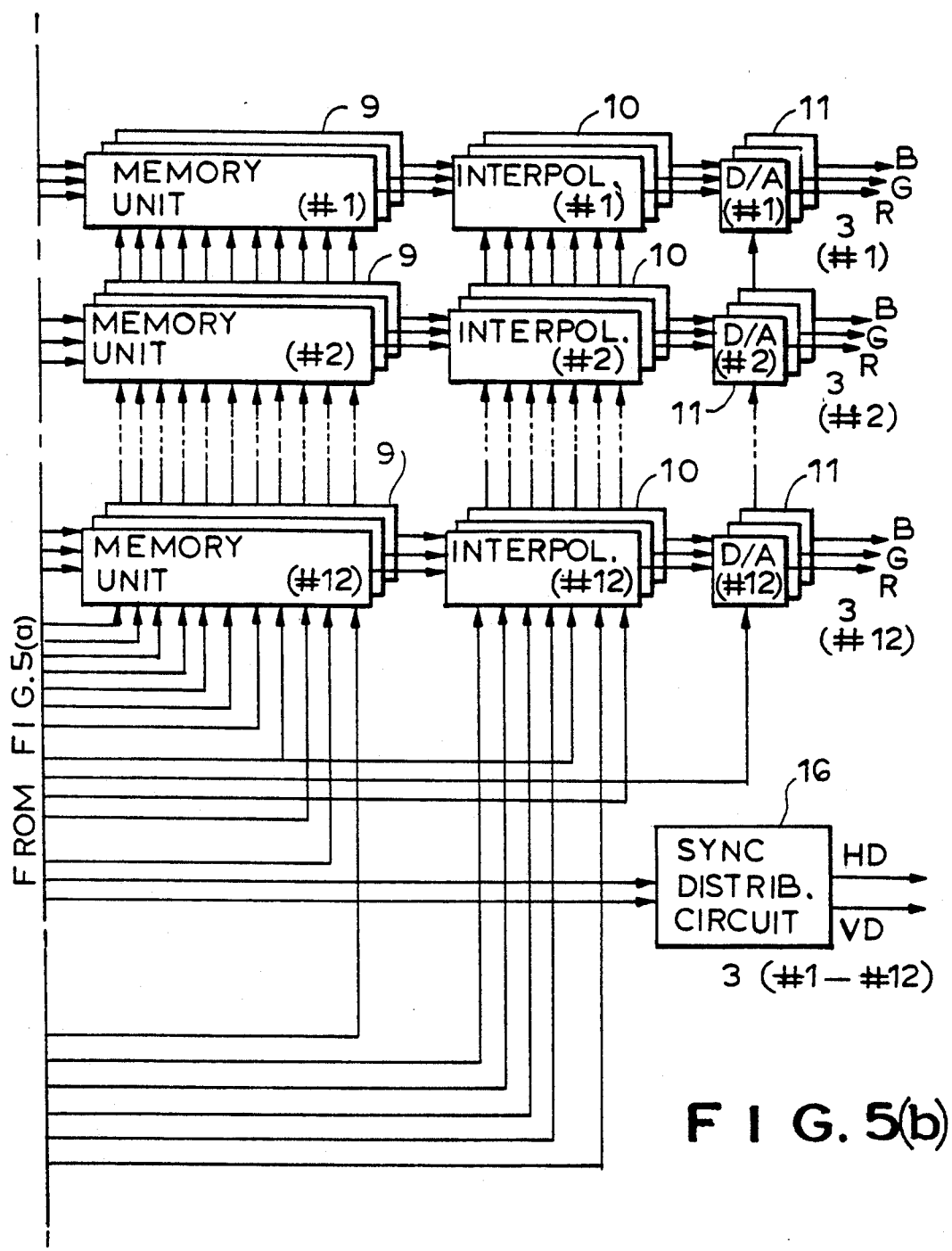

Referring to FIG. 5, the signal converting part of FIG. 4 will be described in detail. As shown, the Hi-Vision video source 1 delivers an analog video signal, a horizontal synchronizing signal HD, and a field discriminating signal WRFO/E for discriminating odd and even fields. In this case, the analog Hi-Vision video signal consists of R (red), G (green) and B (blue) component signals corresponding to three primary colors or the combination a single luminance signal Y and two chrominance difference signals Pr and Pb. The illustrative embodiment will be described in relation to the R, G and B component signals by way of example. It is generally accepted that 20 MHz is sufficient for Hi-Vision signal band when it comes to VTR or MUSE decoder processing. Then, the required sampling frequency may be substantially 45 MHz to 55 MHz. Such sampling frequencies are produced by multiplying the horizontal synchronizing frequency by n. Since n should preferably be the sum of 2's integral power from the circuit arrangement standpoint, the illustrative embodiment uses "1536 ($1024 (2^{10}) + 512 (2^9)$)" as n. In this case, the sampling frequency is 51.84 MHz (33.75 kHz×1536).

In FIG. 5, the R, G and B component signals from the Hi-Vision source 1 are converted by ADCs 8 into digital signals by the sampling frequency of 51.84 MHz. The digital signals are fed from the ADCs 8 to memory units 9 (#1 to #12) and selectively written to the memory units 9 in a predetermined sequence. The digital signals are read in parallel out of the memory units 9 (#1 to #12) in a sequence associated with the NTSC system and delivered to interpolators 10 (#1 to #12). The interpolators 10 (#1 to #12) each multiplies the number of scanning lines by 7/5 and feeds the resulting signal to respective one of twelve DACs 11 (#1 to #12). The analog output video signals from the DACs 11 (#1 to #12) are fed to respective NTSC displays units 3 (#1 to #12).

A write clock generator 12 generates, in response to the signals HD and WRFO/E from the source 1, a write clock WRCLK having a frequency of 51.84 MHz, a write signal FMWR, a write horizontal blanking signal WRHBLK for discriminating a horizontal active period and a horizontal blanking period, a write vertical blanking signal WRVBLK for discriminating a vertical active period and a vertical blanking period, a write frame clear signal WRFRCL, and the field discriminating signal WRFO/E.

A write memory selector 13 receives the write clock WRCLK, write horizontal blanking signal WRHBLK, write vertical blanking signal, and write field discriminating signal WRFO/E from the write clock generator 12. In response, the write memory selector 13 feeds to the memory units 9 (#1 to #12) memory select signals (i.e. horizontal select signal HiSEL (i=1, 2, 3, 4) and vertical select signal VjSEL (j=1, 2, 3)), which are indicative of particular one of the twelve memory units 9 (#1 to #12) to which digital video signals should be written. Specifically, input digital signals are written to the individual memory units 9 under the control of the memory select signals and in synchronism with the write clock WRCLK.

A read timing generator 14 receives the write clock WRCLK and write frame clear signal WRFRCL from the write clock generating circuit 12. In response, the read timing generator 14 produces a read signal FMRD, a read clock RDCLK, a read horizontal blanking signal RDHBLK for discriminating a horizontal active period and a horizontal blanking period of the reading side, a vertical read blanking signal RDVBLK, a signal CYCSTRT for controlling the interpolator 10 (#1 to #12), a read field discriminating signal RDFO/E of the reading side, horizontal drive pulses RDHD, and vertical drive pulses RDVD.

A read address generator 15 generates a read address RDADRS and interpolation control signals F1WE, F2WE, F1RD, F2RD and MUXC in response to the read clock RDCLK, horizontal and vertical blanking signals RDHBLK and RDVBLK and control signal CYCSTRT from the read timing generator 14.

A sync distributing circuit 16 delivers synchronzing pulses HD and VD to the individual display units 3 in response to the horizontal and vertical read drive pulses RDHD and RDVD.

FIG. 6 shows a specific construction of the write clock generator 12 in FIG. 5. In the figure, a PLL (phase locked loop) circuit 17 receives the Hi-Vision horizontal synchronizing signal HD and multiplies the frequency thereof by 1,536 to produce the write clock WRCLK having frequency of 51.84 MHz. A write horizontal counter 18 counts the write clock WRCLK, from 0 to 1,535, and is cleared by the Hi-Vision horizontal synchronizing signal HD. Receiving the output of the write horizontal counter 18, a decoder 19 generates the write horizontal blanking signal RHBLK and a signal WR2FH. The blanking signal RHBLK remains active only during a horizontal blanking period, while the signal WR2FH becomes active at the middle plint of the horizontal blanking period.

A write vertical counter 20 counts the signals WR2FH and is cleared by a frame clear signal WRFRCL which will be described. Specifically, the counter 20 increments from "0" to "2249", i.e., it counts 2250 times which is twice the total number of lines particular to the High Vision system. Receiving the output of the counter 20, a decoder 21 generates the write vertical blanking signal WRVBLK which remains active during a vertical blanking period.

A flip-flop 22 generates an inverted output of a D input onto a $\overline{Q}$ output in response to the leading edge of the Hi-Vision field discriminating signal WRFO/E. The inverted output on the $\overline{Q}$ output is cleared by the next the horizontal synchronizing signal HD. As a result, the write frame clear signal WRFRCL having a period during the first 1H period of each odd field is obtained.

A memory write signal generator 23 generates a write signal synchronous to sampling by using the write clock WRCLK. The write signal comprises RAS (Row Address Strobe), CAS (Column Address Strobe) or WE (Write Enable) in the case of a parallel input dynamic RAM, or SC (Serial Clock) in the case of a serial input dynamic RAM. In the illustrative embodiment, the write signal is called an FMWR (Frame Memory Write) signal, and write-in occurs when this signal is active.

Figure 7:
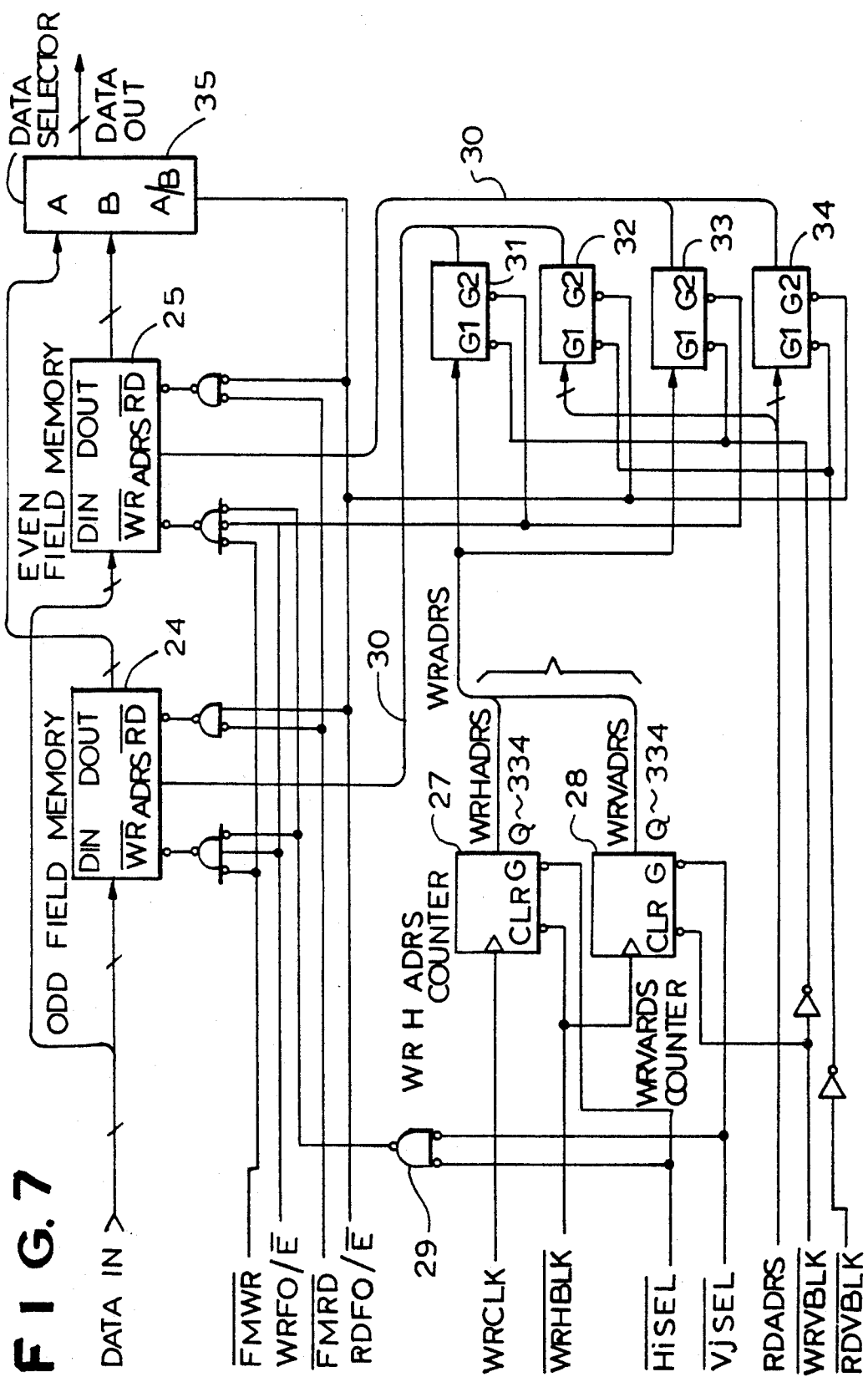
FIG. 7 is a block diagram schematically showing a memory unit also shown in FIG. 5.

The memory units 9 each has a construction associated with the color signals R, G and B and has a capacity corresponding to one frame of the conventional NTSC system. A specific construction of each memory unit 9 is shown in FIG. 7. As shown, the memory unit 9 has an odd field memory 24 and an even field memory 25. Generally, writing and reading operations to a certain address of a memory at the same time is not practicable and conflicting. The two field memories 24 and 25 allow an even field to be read out while an odd field is written, and vice versa. Nevertheless, when the vertical synchronizing frequency is different between the writing side and the reading side, it is likely that one of the write and read addresses passes the other at a certain time point, resulting in the conflict of reading and writing operations. Since a display unit of the conventional NTSC system is capable of synchronizing with the vertical synchronizing frequency 60 Hz of the Hi-Vision system, writing and reading sides commonly operate with frame the vertical synchronizing frequency 60 Hz. Accordingly, addressing conflict in the memory unit is removed.

Regarding the size of the memory unit, the effective pixel ratio of the Hi-Vision system is 0.873 (1920÷2200) which is derived from the 1125/60 HDTV studio standards. Since the sampling number per line is selected to be 1536, the number of effective pixels is 1341 (1536×0.873). Such 1341 pixels are displayed on a horizontal array of four display units, so that the number of effective pixels in the horizontal direction of the NTSC display unit is 335.25 (1341÷4), i.e. about 335. At the same time, since the effective number of lines of the Hi-Vision system is 1035, 345 effective lines (1035÷3=345) are written to one memory unit 9. Consequently, the size of each memory unit 9 should only be greater than 335 (H)×345 (V) pixels.

A write address generator 26 in the memory unit 9 is made up of a write horizontal address counter 27 and a write vertical address counter 28. For the above-stated reason, the horizontal address counter 27 needs only to count 335 while the vertical address counter 28 needs only to count 345 lines in total including the even and odd fields. Moreover, since one half of the number of effective lines is 172.5, the counter 28 only has a capacity to count "173". As described, the write address generator 26 is incorporated in each of the memory units 9. Should a single write address generator be shared by all of the twelve memory units, the address would have to be converted into a local address on a memory unit basis.

The write horizontal address counter 27 counts the write clock WRCLK and is cleared by the write horizontal blanking signal WRHBLK. Hence, the counter 27 counts 335 times from "0" to "344". When a horizontal select signal HiSEL (i=1, 2, 3, 4) (which will be described) is not active, the counter 27 is inhibited from counting the write clock WRCLK.

The write vertical address counter 28 counts the write horizontal blanking signal WRHBLK and is cleared by the write vertical blanking signal WRVBLK. Hence, the counter 28 counts 172 times from "0" to "171" in the odd field and counts 173 times from "0" to "172" in the even field. When a vertical select signal VjSEL (j=1, 2, 3) (which will also be described) is not active, the counter 28 is inhibited from counting the blanking signal WRHBLK. In the event of write-in, when both the horizontal select signal HiSEL and the vertical select signal VjSEL are active, a gate 29 allows data to be written to the memories 24 and 25. As a result, only the video signal associated with a necessary area is written to the memory unit 9.

Addresses generated by the write horizontal and vertical address counters 27 and 28 are fed over an address bus 30 of the memory unit to one of the odd and even field memories 24 and 25 which is designated by the write field discriminate signal WRFO/E. Also fed to the field memory 24 or 25 designated by the read field discriminate signal RDFO/E is a read address RDADRS outputted by the read address generator 15 (FIG. 5). Address bus selectors 31 to 34 select one of the address buses 30 of the memories 24 and 25. The address bus selection is performed on the basis of the individual blanking signals in the event reading and writing. Hence, the write and read addresses are prevented from conflicting with each other on the address bus whenever the individual vertical blanking periods have a certain timing different.

The memory write signal FMWR is applied to the signal input terminal of the memory unit only when both the horizontal select signal HiSEL and the vertical select signal VjSEL are active.

The memory read signal FMRD is applied via the read signal input terminal of the memory unit to one of the ODD and EVEN field memories 24 and 25 which is designated by the read field discriminate signal RDFO/E. The outputs of the field memories 24 and 25 are fed to a data selector 35, so that only the data being read out is outputted.

FIG. 8 shows a specific construction of the write memory select signal generator 13 of FIG. 5. This generator 13 generates select signals for designating one of the twelve memory units to which the Hi-Vision video signal should be written. In the figure, a horizontal position counter 36 counts the write clock WRCLK while feeding the count value to a horizontal position decoder 37. In response, the decoder 37 outputs horizontal memory select signals HiSEL (i=1, 2, 3, 4) on the basis of the count value. A vertical position counter 38 uses the write horizontal blanking signal WRHBLK as a clock and feeds a count value thereof to a vertical position decoder 39. The vertical position decoder 39 outputs vertical memory select signals VjSEL (j=1, 2, 3) in response to the count value.

FIG. 9 shows a chart showing the generation logic of the above-stated select signals. As shown, the horizontal and vertical arrays of the display screen are labeled H1 to H4 and V1 to V3, respectively. The horizontal memory select signal HiSEL (i=1, 2, 3, 4) is indicative of a particular horizontal array being currently sampled. Regarding the horizontal direction, signals remaining active respectively from the start position (first pixel) of the effective Hi-Vision picture area to the 335th pixel, from the 336th pixel to the 670th pixel, from the 671st pixel to the 1005th pixel, and from the 1006th pixel to the 1340th pixel are generated and used as the select signals associated with the arrays H1, H2, H3 and H4. Regarding the vertical direction of the odd field, signals remaining active respectively from the start position (first line) of the effective lines to the 172nd line, from the 173rd line to the 345th line, and from the 346th line to the 517th line are generated. Likewise, in the case of the even field, signals remaining active respectively from the first line to the 173rd line, from the 174th line to the 345th line, and the 346th line to the 518th line are generated. These signals associated with the vertical direction are the select signals VjSEL (j=1, 2, 3) associated with the vertical arrays V1, V2 and V3. By the combination of such signals HiSEL and VjSEL, it is possible to produce twelve different select signals. Since one of the twelve combinations of select signals shown in FIG. 9 correspond to display unit, i.e., one memory unit, of the conventional NTSC TV system, the Hi-Vision video signal can be written to expected one of the twelve memory units.

Referring back to FIG. 5, the read timing generator 14 generates the read clock RDCLK for reading data out of the memory units 9 at the corresponding rate of the conventional NTSC TV system rate. The easiest way to generate the read clock RDCLK is dividing the frequency of the write clock WRCLK particular to the Hi-Vision system. Whether or not such a scheme is practicable will be stated. Assume that the sampling number per line of each display unit 3 is 412, and that the sampling frequency is one-eighth of the Hi-Vision sampling frequency. Then, the line frequency is 15.728 kHz (51.84 MHz ÷ 8 ÷ 412) which is very close to the horizontal scanning frequency of the NTSC TV system. In this condition, the horizontal blanking ratio is 0.188 [(412−335)÷412]. Although the blanking ratio of 0.188 is slightly greater than the blanking ratio of the NTSC TV system, i.e. 0.172 (10.9 μsec ÷ 63.556 μsec), such a difference can be sufficiently coped with by the little adjustment of the horizontal amplitude of the display unit. The circuit is implemented as an integral frequency dividing circuit since it is extremely simple and inexpensive.

FIG. 10 shows a specific construction of the above-mentioned read timing generator 14 in FIG. 5. In the figure, a frequency divider 40 divides the write clock WRCLK by 8 to produce a read clock RDCLK. The read clock RDCLK is fed to a read horizontal counter 41 which in turn outputs horizontal position data based on the count thereof. Combined with a decoder 42, after 412 counts from "0" to "411" the counter 41 carries up and then starts counting from "0" again. The counter 41 is cleared by the write frame clear signal WRFRCL to synchronize the read timing generator 14 (FIG. 5) to the Hi-Vision frame. The decoder 42 produces the horizontal synchronizing signal RDHD and horizontal blanking signal RDHBLK for the reading side in response to the horizontal position data. Decoded values at the decoder 42 need only to be the values which RDHD and RDHBLK actually need, and the phase of the output picture will be readily changed if the decoded values are changed. A relation between such decoded values and the signal waveforms is shown in FIG. 11(a). The carry output of the horizontal counter 42 is also connected to the enable input EN of a vertical counter 43, causing the counter 43 to count vertical positions. The vertical counter 43 is cleared by the clear signal WRFRCL for the frame synchronization to the input side. A decoder 44 decodes the vertical position data outputted by the counter 43. As a result, the decoder 44 produces the read vertical synchronizing signal RDVD and read vertical blanking signal RDVBLK. Further, the decoder 44 outputs a control signal CYCSTRT for controlling the interpolating circuits 10 (FIG. 5), and which becomes active seven lines before the signal RDVBLK. FIG. 11(b) indicates a relation of the decoded values of the decoder 44 to the signals RDVD, RDFO/E, and RDVBLK.

A memory read signal generator 45 generates a read signal on the basis of the read clock RDCLK for reading data out of the memory unit. The read signal is RAS (Row Address Strobe), CAS (Column Address Strobe) and WE (Write Enable) in the case of a parallel output dynamic RAM or SC (Serial Clock) in the case of a serial output dynamic RAM. In the illustrative embodiment, the read signal is called an FMRD (Frame Memory Read) signal, and read-out is assumed to occur when this signal is active.

A reference will be made to FIG. 12 for describing a specific construction of the read address generator 15 in FIG. 5. This generator generates actual read addresses associated with the memory unit 9 and control signals for the interpolator 10 which will be described. A read horizontal address counter 46 is incremented by the read clock RDCLK and cleared by the read horizontal blanking signal RDHBLK, i.e., it is incremented by each clock in the effective period. A read vertical address counter 47 counts the read horizontal blanking signals RDHBLD and is cleared by the read vertical blanking signal RDBLK. Further, the counter 47 is inhibited from counting up read addresses by a count enable signal COUNTEN in relation to the interpolator 10. Such a procedure will be described in detail later in conjunction with description of the interpolator 10. Since the number of effective lines stored in the memory unit is 345 in total including both of the odd and even fields, the vertical address counter 47 is simply required to count more than "172.5", i.e., "173" which is one half of the number of effective lines.

The read horizontal and vertical addresses produced by the above procedure are used as the read address RDADRS of the memory unit. A read cycle counter 48 is a 7-step counter and cleared by the signal CYCSTRT. The output of the counter 48 is fed to a decoder 49 which in turn produces signals for defining the operation timings of the interpolator 10, i.e. F1WE, F2WE, F1RD, and F2RD as will be described in detail later.

Figure 13A:
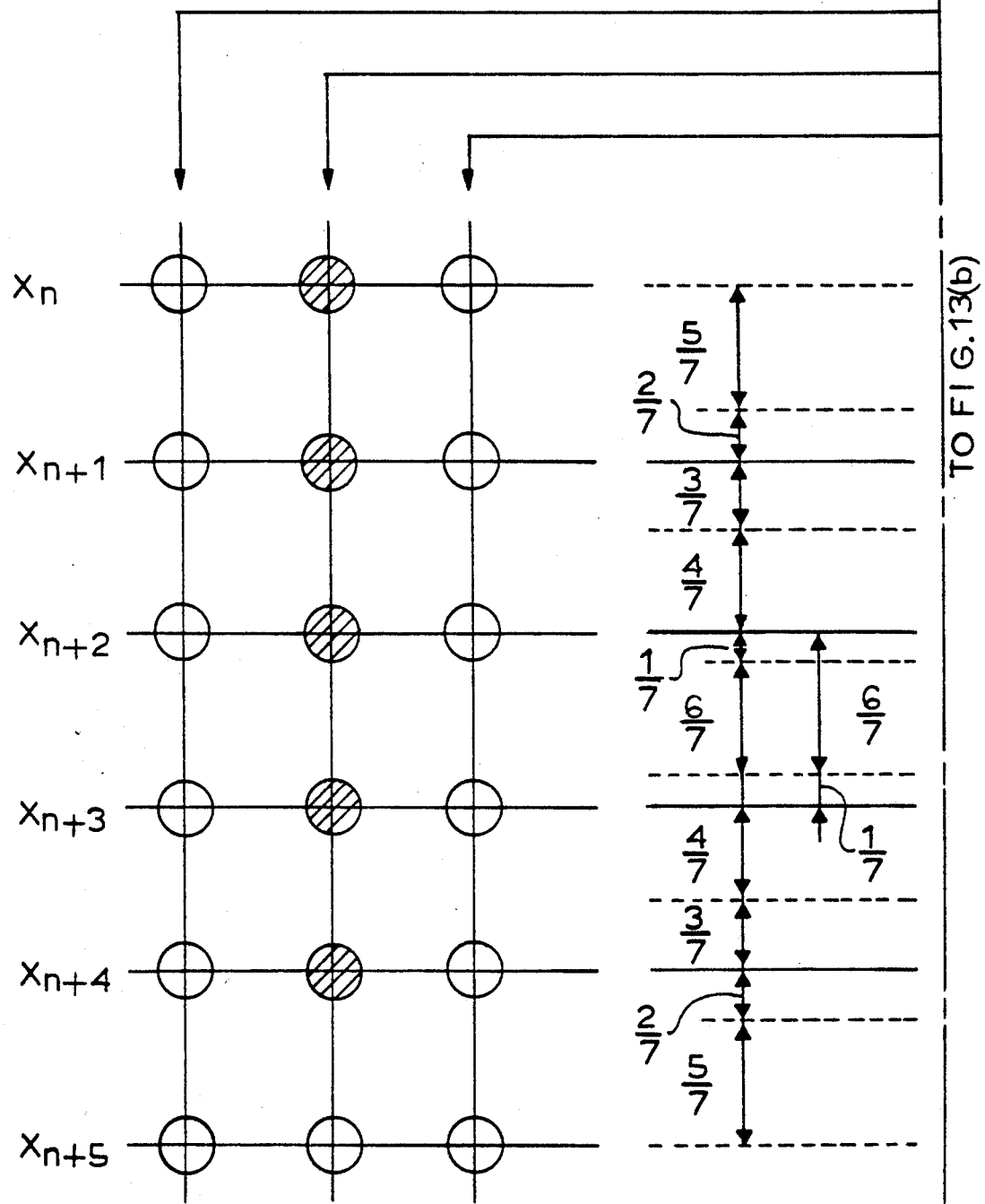
FIG. 13 is a view useful for understanding the operation of an interpolator shown in FIG. 5.
Figure 13B:
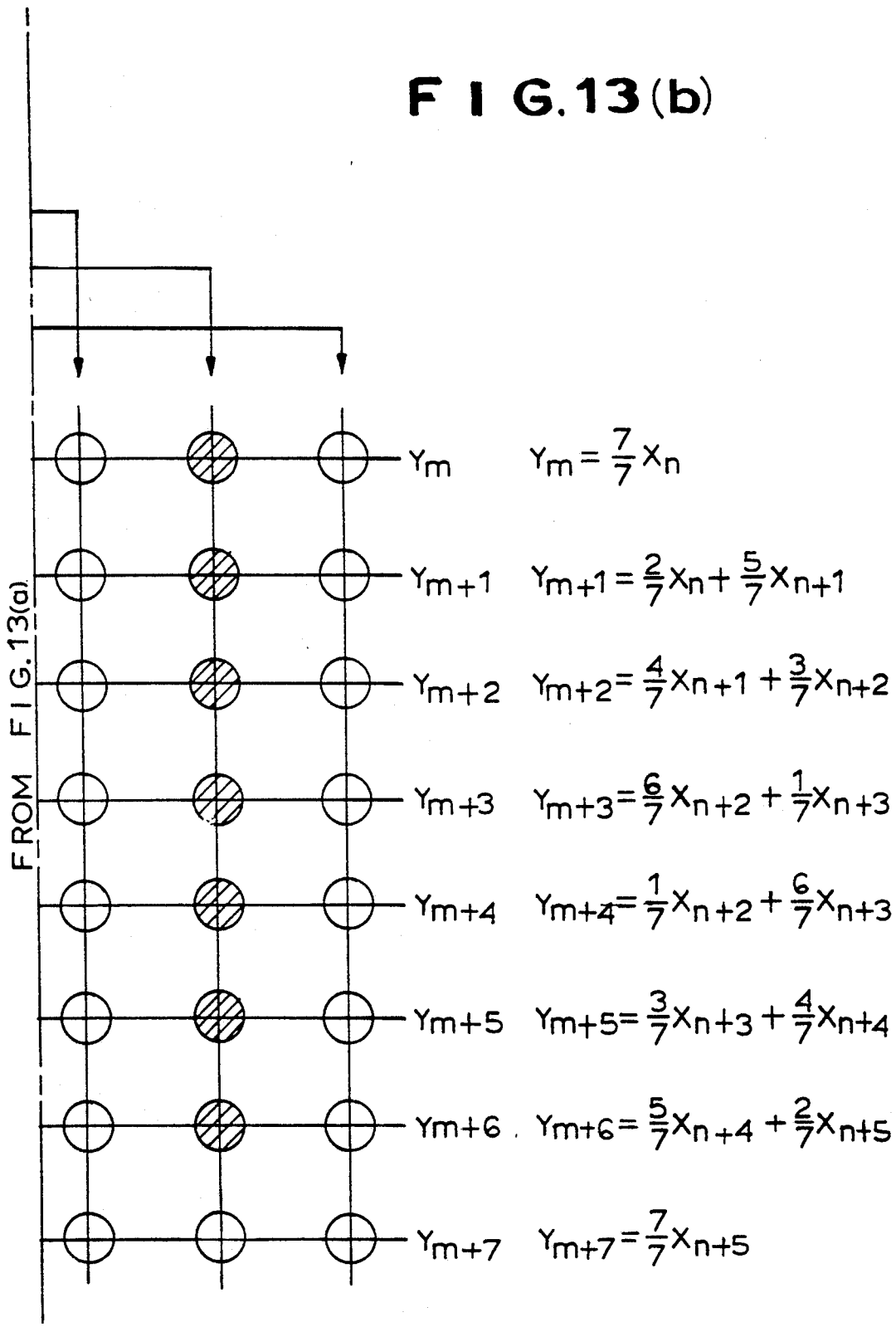

The interpolator 10 produces seven output (read-out) data in response to five input (write-in) data. The principle of such 5:7 interpolation will be described with reference to FIG. 13. To begin with, a certain effective line (the first effective line, for example) of the Hi-Vision video signal is determined as a reference line, and then a pixel $X_n$ located at a certain horizontal position on the reference line is observed. Four pixels $X_{n+1}$, $X_{n+2}$, $X_{n+3}$ and $X_{n+4}$ located at the same horizontal position as the pixel $X_n$ are determined in the following four lines. On the other hand, seven pixels $Y_m$, $Y_{m+1}$, $Y_{m+2}$, $Y_{m+3}$, $Y_{m+4}$, $Y_{m+5}$ and $Y_{m+6}$ associated with the five pixels $X_n$ to $X_{n+4}$ are assumed in the following horizontal lines of the NTSC video signal. Therefore, data $y_{m+6}$ of a pixel $Y_{m+L}$ ($0 \leq L \leq 6$) is calculated as a sum of one or two data x of pixels X closest to the pixel $Y_{m+L}$ in the vertical direction with weighted factor inversely proportional to the closeness. For example, $Y_m$ has the same position as $X_n$ in the vertical direction, so that data $y_m$ of $Y_m$ is equal to data $x_n$ of $X_n$. Further, $Y_{m+1}$ is spaced apart from $X_n$ by a distance of 5/7 and from $X_{n+1}$ by a distance of 2/7 and, therefore, data $y_{n+1}$ are determined as a sum of the product of $x_n$ and 2/7 and the product of $x_{n+1}$ and 5/7. Such a principle holds true with the other pixel data $y_{m+2}$ to $y_{m+6}$ as well. Regarding a pixel $Y_{m+7}$, it assumes the same position as $X_{n+5}$ in the vertical direction, i.e., $y_{m+7} = x_{n+5}$ which is the same in relation as $y_m = x_n$. The procedure described above is repeated thereafter to produce seven NTSC scanning lines from five Hi-Vision scanning lines.

FIG. 14 shows a specific construction of the interpolator 14 for implementing the above-described principle. As shown, the interpolator 14 comprises two FIFO (First In First Out) memories 50 and 51 each having one line storage capacity. FIG. 15 depicts a reading and a writing sequence of the FIFO memories 50 and 51. Regarding data $y_{m+1}$, for example, data $x_n$ written into the FIFO memory 50 during a horizontal scanning period two lines before and data $x_{n+1}$ written into the FIFO memory 51 during a horizontal scanning period one line before are read out in the same time and applied to a computing circuit 52. The 5:7 interpolation is executed by using the above procedure.

In the illustrative embodiment, during the horizontal scanning periods including the pixels $Y_{m+2}$ and $Y_{m+3}$, data $x_{n+3}$ is read out of the memory unit 9 and written into the FIFO memory 51 while, during the horizontal scanning periods including the pixels $Y_{m+5}$ and $Y_{m+6}$, data $x_n$ is read out of the memory unit 9 and written into the FIFO memories 51 and 50. Therefore, during these horizontal scanning periods, the read address of the memory unit 9 should not increase although the line address of the FIFO memory increases. The count enable signal COUNTEN delivered from the decoder 49 (FIG. 12) is adapted to control the read address, i.e., to inhibit the vertical address of the memory unit 9 from being incremented. This signal COUNTEN is produced by decoding the count value of the cycle counter 48.

Even at the time of computation on the first line, the FIFO memory 50 has to be loaded with data of the first line beforehand. Specifically, the data of the first line has to be written beforehand at the leading edge of the read vertical blanking signal RDVBLK. To start this writing cycle, the read timing generator 14 generates the previously mentioned signal CYCSTRT as a start signal. The signal CYCSTRT begins seven lines before the leading edge of the read vertical blanking signal RDVBLK, whereby the read cycle counter 48 is started. More specifically, the data is allowed to be written to either one of the FIFO memories 50 and 51 which is enabled by the count of the cycle counter 48. However, since the write vertical address counter 47 is not started until the signal RDVBLK begins, only the vertical address 0 line data is written to the FIFO memories 50 and 51. Further, the FIFO memory read cycle is prevented from starting until the read vertical blanking signal DRVBLK begins, so that the read-out of needless data is eliminated. The decoder 49 outputs the write control signals F1WE, F2WE and read control signals F1RD and F2RD meant for the FIFO memories 50 and 51 on the basis of the count of the cycle counter 48.

Referring back to FIG. 14, the computing circuit 52 performs the arithmetic operations as shown in FIG. 15 by obtaining data indicative of, among the seven cycles, a particular sequence which is under way from the FIFO memories 50 and 51. A read only memory (ROM) is one of the most inexpensive implementations for the computing circuit 51. Specifically, a ROM may be loaded with data associated with input data and calculated beforehand. In the illustrative embodiment, the computing circuit 52 is implemented with a ROM, and two groups of 8-bit video data and 3-bit sequence data MUXC (selecting seven kinds in practice), i.e., nineteen bits in total are used as inputs to produce 8-bit (one byte) of video data.

The illustrative embodiment shown and described is practicable easily and inexpensively and is operable satisfactorily if adequate numerical values are selected. In practice, however, the embodiment brings about the following problem.

Assume that the Hi-Vision video signal has HNH horizontal scanning lines in the frame period and SNH samplings in the horizontal scanning period, that the conventional NTSC TV system has HNN horizontal scanning lines in the frame period and SNN samplings in the horizontal scanning period, and that the frequency division ratio for the generation of the read clock is n. Then, time deviation will occur frame period by frame period unless the following equation is satisfied:

$$HNH \times SHN = n \times HNN \times SNN \qquad \text{Eq. (1)}$$

When the specific numerical values are substituted for the individual terms of the Eq. (1), Left member: $1125 \times 1536 = 1728000$ Right member: $8 \times 525 \times 412 = 1730400$ Therefore, the deviation amounts to 2400 clock pulses per frame, i.e., about 46.3 $\mu$sec since clock frequency is 51.84 MHz. Should no measure be taken against such deviation, the display would fail to synchronize itself to the Hi-Vision video signal, causing distortion of displayed image.

Some different approaches are available for eliminating the above problem, as follows.

A first approach is to enhance the following ability of the display of the conventional NTSC TV system. This approach, however, is difficult to implement in practice.

Generating a read clock for the conventional NTSC TV system which is locked to the Hi-Vision sampling clock by use of a PLL circuit, for example, is a second approach. By using the specific numerical values mentioned above, the frequency division ratio of the sampling clock is:

$$1728000 \div 216300 = 7.989$$

Although producing the read clock with such frequency division ratio (7.989) may suffice, this kind of scheme is not practicable without resorting to complicated and expensive circuitry.

A third approach is to bring the reading sampling number of the conventional NTSC TV system close to the Hi-Vision total sampling number. When only the horizontal reading number is incremented or decremented for achieving the above purpose, a unit that changes per increment or decrement by one pixel for the horizontal scanning period is:

$$1 \ (pixel) \times 525 \ (lines) \times 8 \ (clocks) = 4200$$

Specifically, assuming that the Hi-Vision sampling clock is 51.84 MHz, the above unit of change corresponds to about 81 μsec. Then, incrementing or decrementing on the basis of such a unit would be meaningless. On the other hand, assuming that the Hi-Vision sampling number per line is 1568 and that one line of the conventional NTSC TV system is repeated 420 consecutive times, then the two reading numbers coincide, as follows:

$$HSN = 1568 \times 1125 = 1764000 \ (times)$$

$$NSH = 420 \times 525 \times 8 = 1764000 \ (times)$$

However, since the numerical value "1568" cannot be represented by the sum of 2's integral multiples, the horizontal address counter would be complicated in construction. Moreover, the horizontal blanking ratio at the read-out side would be as great as about 20.2% [1−(335+420)] and would require a substantial change in the horizontal amplitude of the conventional TV display unit. So changing the horizontal amplitude is not practical when it comes to the display made up of twelve units.

An alternative embodiment which will be described is representative of a unique approach free from the drawbacks particular to the specific approaches stated above. A display unit of the NTSC TV system can display a picture satisfactorily even when the blanking period is several lines longer or shorter than the standard. This embodiment, therefore, changes the sampling number per line to 413 from 412 and the number of horizontal lines per frame to 523 from 525 while maintaining the Hi-Vision sampling number per line of 1536 and the ratio of Hi-Vision sampling clock and the reading clock of 8:1. Then, $$NSH = 413 \times 523 \times 8 = 1727992$$

Hence, the deviation per frame period is $$1728000 - 1727992 = 8 \ (clock)$$

Such deviation per frame is as short as 154.3 nsec in terms of time and can be satisfactorily coped with by the conventional NTSC TV display apparatus. The fact that the number of lines in a frame is short by two lines does not matter at all.

The alternative embodiment is practicable only if the read horizontal counter 41 in the read timing generator shown in FIG. 10 is provided with a carry-up value of "412" and the read field discriminating signal RDFO/E associated with the read timing generator changes at the 261.5th line. Specifically, this embodiment also uses the read timing generator shown in FIG. 10 except for conditions set in the decoders 42 and 44. Namely, the carry-up value of the decoder 42 is selected to be "412", and the decoding values of the decoder 44 for generating the signals RDVBLK, RDFO/E, CYCCLR and RDVD each is reduced by 1. In FIG. 11(*b*), a read vertical drive signal, a read field discriminating signal and a read vertical blanking signal which are particular to the alternative embodiment are labeled RDVD', RDFO/E' and RDVBLK', respectively.

In summary, it will be seen that the present invention provides a display made up of a plurality of display units of a conventional system which are arranged in rows and columns for displaying an HDTV video signal. A display apparatus according to the present invention is extremely useful since conventional TV displays are more advantageous in luminance, more stable, and less expensive than a HDTV proper display. Further, the display apparatus of the present invention can be usable as a multi-video apparatus for a video source of a conventional TV system.

What is claimed is:

1. A display apparatus made up of a plurality of display units of a conventional television (TV) system for displaying a video signal of a high definition television (HDTV) system, comprising:

means for generating a clock having a first frequency, said first frequency being produced by multiplying a horizontal synchronizing signal of said high definition television system by n (an integer), said n being the sum of 2's integral power;

an analog-to-digital converter (ADC) for converting an HDTV video signal into a digital video signal by sampling said HDTV video signal at said first frequency:

write address generating means for generating, on the basis of said first frequency, a write address in synchronism with said HDTV video signal;

a video memory for storing the digital video signal from said ADC in response to said write address;

read address generating means for generating a read address for said video memory on the basis of a frequency divided signal of said first frequency, said read address being such that a plurality of digital video signals associated with said plurality of display units are read out in parallel out of said video memory; and a digital-to-analog converter (DAC) for converting the plurality of digital video signals read out in parallel out of said video memory into analog signals and feeding said analog signals to said plurality of display units.

2. A display apparatus as claimed in claim 1, wherein said HDTV system has 1125 scanning lines per frame, sixty fields per second and an aspect ratio of 16:9 and performs interlace scanning, said plurality of display units comprising twelve NTSC display units which are arranged in three rows and four columns; and wherein said n is 1536, said first frequency is 51.84 Mhz, said read address being generated on the basis of a clock having a frequency of 6.48 Mhz which is 1/8 of 51.84 Mhz.

* * * * *